US005306035A

United States Patent [19]

Counts

[11] Patent Number: 5,306,035

[45] Date of Patent: Apr. 26, 1994

[54] SINGLE-HAND MANUAL DRIVE WHEELCHAIR ASSEMBLY

[75] Inventor: David M. Counts, Fresno, Calif.

[73] Assignee: Quickie Designs Inc., Fresno, Calif.

[21] Appl. No.: 17,765

[22] Filed: Feb. 16, 1993

[51] Int. Cl.[5] .......... B62M 1/14

[52] U.S. Cl. .......... 280/250.1; 280/304.1; 280/270

[58] Field of Search .......... 280/250.1, 240, 270, 280/304.1, 242.1; 297/DIG. 4

[56] References Cited

U.S. PATENT DOCUMENTS

| | | | |
|---|---|---|---|
| 4,506,900 | 3/1985 | Korosue | 280/250.1 |
| 4,553,770 | 11/1985 | Lyman | 280/304.1 |
| 4,641,847 | 2/1987 | Busse | 280/240 X |
| 4,684,171 | 8/1987 | Roy et al. | 280/250.1 X |
| 4,938,623 | 7/1990 | Alexander | 280/304.1 X |
| 4,993,732 | 2/1991 | Wedemeyer | 280/250.1 |
| 5,020,815 | 6/1991 | Harris et al. | 280/270 X |
| 5,112,072 | 5/1992 | Korosue | 280/240 |

*Primary Examiner*—Karin L. Tyson
*Assistant Examiner*—Carla Mattix
*Attorney, Agent, or Firm*—Flehr, Hohbach, Test, Albritton & Herbert

[57] ABSTRACT

A single-handed manual drive wheelchair assembly (20) for a wheelchair (10) is provided for triplegic persons having use of only one hand. A first drive wheel (22) is provided rotatably mounted to one side (13) of a wheelchair frame (11), while a second drive wheel (23) is rotatably mounted to an opposite side (14) of the frame (20). A manual hand-rim assembly (26) positioned proximate the first drive wheel (22) which is mounted for rotation relative to the first drive wheel (22) about a common wheel axis (24). An elongated drive axle member (30) is coupled between the hand-rim assembly (26) and the second drive wheel (23) which is substantially axially aligned to rotate about the common wheel axis (24). The axle member (30) includes a first latching mechanism (31) on one end thereof which is releasably coupled to the hand-rim assembly (26). The axle member (30) further includes a second latching mechanism (32) on an opposite end thereof which is releasably coupled to the second drive wheel (23) such that manual rotation of the hand-rim assembly (26) from a working-hand side of the wheelchair (10) rotatably drives the second drive wheel (23).

17 Claims, 3 Drawing Sheets

SINGLE-HAND MANUAL DRIVE WHEELCHAIR ASSEMBLY

TECHNICAL FIELD

The present invention relates, generally, to manual wheelchair assemblies and, more particularly, to single-hand manual drive wheelchair assemblies.

BACKGROUND ART

Most conventional manually driven wheelchair assemblies are directed toward paraplegic persons having full or partial use of both hands. Triplegic or monobrachius persons having use of only a single hand (i.e., one-handed persons), however, cannot manually operate these assemblies. Modifications to the drive wheels are generally required which allow manual operation of both wheels from the working-hand side of the wheelchair.

Ordinarily, single-handed drive assemblies for manual wheelchairs provide two individually operable and concentrically positioned manual hand-rim assemblies, each driving one wheel, which are mounted on the working-hand side of the wheelchair frame. A first hand-rim assembly is directly mounted to the rim of a first wheel on one side of the wheelchair, while the second hand-rim assembly, located adjacent to and concentric with the first hand-rim assembly, is operably coupled to an opposite second wheel positioned on an opposing side of the wheelchair frame. An elongated drive axle operably couples the central hub of the second wheel to the second hand-rim assembly. Typically, the drive axle extends coaxially with the central hub of the first wheel and is rotationally independent thereof. Accordingly, the second hand-rim assembly is operably coupled to the second drive wheel in a manner enabling the second drive wheel to be driven by manual rotation of the second hand-rim assembly, which is positioned adjacent to the first hand-rim assembly of the working hand side on the wheelchair.

While these prior art single-handed manual drive wheelchair configurations have successfully provided one-handed persons with a means for operating a manual wheelchair, such wheelchairs often present transportation or portability problems in vehicles. Two-handed manually operated wheelchairs, for example, often include wheelchair frames which are collapsible, that is, the side frames are mounted to scissor-like cross frame members such that the opposing sides of the frame can be repositioned into close proximity to one another. Hence, the overall dimension of standard two-handed manual wheelchairs can be substantially reduced, which facilitates portability, storability and transportability in vehicles. Most transport vehicles, accordingly, will not require any special modifications to carry these manual wheelchairs when the frame is collapsed.

Providing collapsible frames for one-handed manual drive wheelchairs, however, is much more difficult and problematic to achieve. As above-indicated, the rigid drive axle usually extends transverse to the sides of the wheelchair frame in an orientation essentially parallel to the direction of the collapse of the conventional collapsing frame. Accordingly, without significant alteration, the drive axle substantially opposes this collapse.

One attempt to overcome this problem includes providing a pivotal joint or series of pivotal joints along the drive axle which allows the drive axle to fold in discrete sections. These sections pivot about a joint axis or axes which is/are oriented perpendicular to the longitudinal axis of the drive axle. Hence, during collapse of the wheelchair frame from the deployed position to a collapsed position, the drive axle similarly moves from an extended position, where each axle section is coaxial with the longitudinal drive axis of the drive axle, to a collapsed position, where the discrete sections of the drive axle pivot about the joints in a manner away from axial alignment.

Pivotally jointed drive axles, however, have several disadvantages. For instance, the drive axle may have to be rotated to a specific orientation to properly align the joint axes so that the axle segments can correctly pivotally fold before the wheelchair frame can be collapsed. These two maneuvers (i.e., aligning the joints of the drive axle and collapsing the wheelchair frame) may be extremely difficult for one-handed persons to simultaneously coordinate. Moreover, these jointed drive axles cause substantial backlash between the hand-rim assembly and the connected drive wheel as the pivotal joints tend to loosen with time and wear. This results in poor response of the connected second drive wheel upon initial manual rotation of the hand-rim assembly. When the operator grips both hand-rim assemblies at the same time to move the chair forward, the first drive wheel will be initially responsive while the second drive wheel, coupled to the drive axle, will not. Hence, the wheelchair operator has start-up problems driving the wheelchair in the desired direction.

DISCLOSURE OF INVENTION

Accordingly, it is an object of the present invention to provide a manually driven wheelchair assembly which can be manually operated by triplegic or monobrachius persons having use of only one hand.

Another object of the present invention is to provide a single-handed manual drive wheelchair assembly which is collapsible.

Yet another object of the present invention to provide a detachable drive axle for a single-handed manual drive wheelchair assembly which reduces backlash between a manual hand-rim assembly and the corresponding drive wheel.

It is another object of the present invention to provide a detachable drive axle for a single-handed manual drive wheelchair assembly which can be attached and detached from the assembly using one hand.

Still another object of the present invention is to provide a single-handed manual drive wheelchair assembly which can be retrofit to existing manually driven wheelchairs.

It is a further object of the present invention to provide a single-handed manual drive wheelchair assembly which is durable, compact, easy to maintain, has a minimum number of components, is easy to use by unskilled personnel, and is economical to manufacture.

The present invention includes a single-handed manual drive assembly for a manual wheelchair having a wheelchair frame for supporting a seat. A first drive wheel is provided rotatably mounted to one side of the frame, while a second drive wheel is rotatably mounted to an opposite side of the frame. The first drive wheel and the second drive wheel are substantially aligned to rotate about a common wheel axis. Further included is a manual hand-rim assembly positioned proximate the first drive wheel which is mounted for rotation, relative to the first drive wheel, about the common wheel axis. An elongated drive axle member is coupled between the hand-rim assembly and the second drive wheel which is substantially axially aligned to rotate about the common wheel axis. The axle member includes a first mounting mechanism on one end thereof which is releasably coupled to the hand-rim assembly. The axle member further includes a second mounting mechanism on an opposite end thereof which is releasably coupled to the second drive wheel for manual operation of the second drive wheel from the hand-rim assembly on the one side.

Accordingly, the present invention provides a single-hand manual drive assembly for a manual wheelchair which includes a drive axle selectively detachable from the drive assembly which facilitates collapse of the wheelchair frame. Furthermore, removal and installation of the drive axle can be easily performed by triplegic persons having use of only one hand.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1:
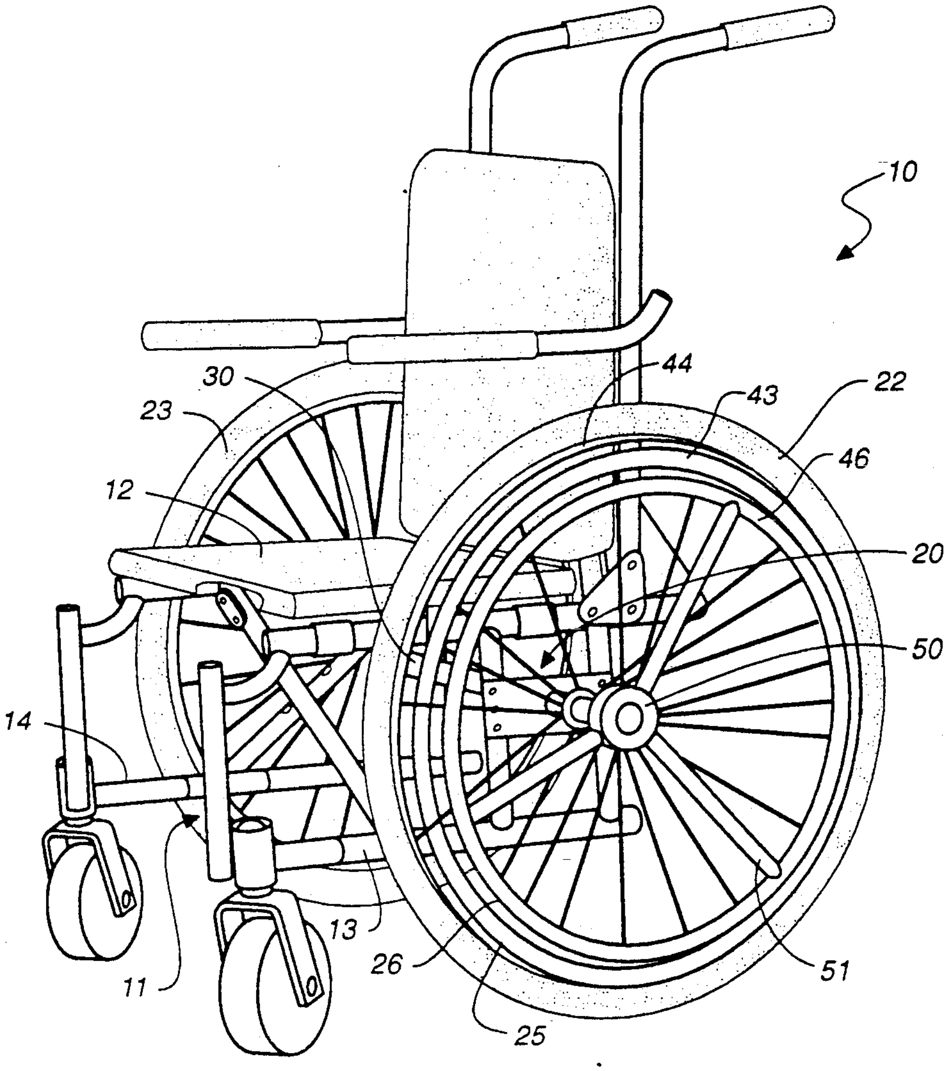
FIG. 1 is a top perspective view of a wheelchair assembly employing a single-hand manual drive assembly constructed in accordance with the present invention.

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Figure 2:
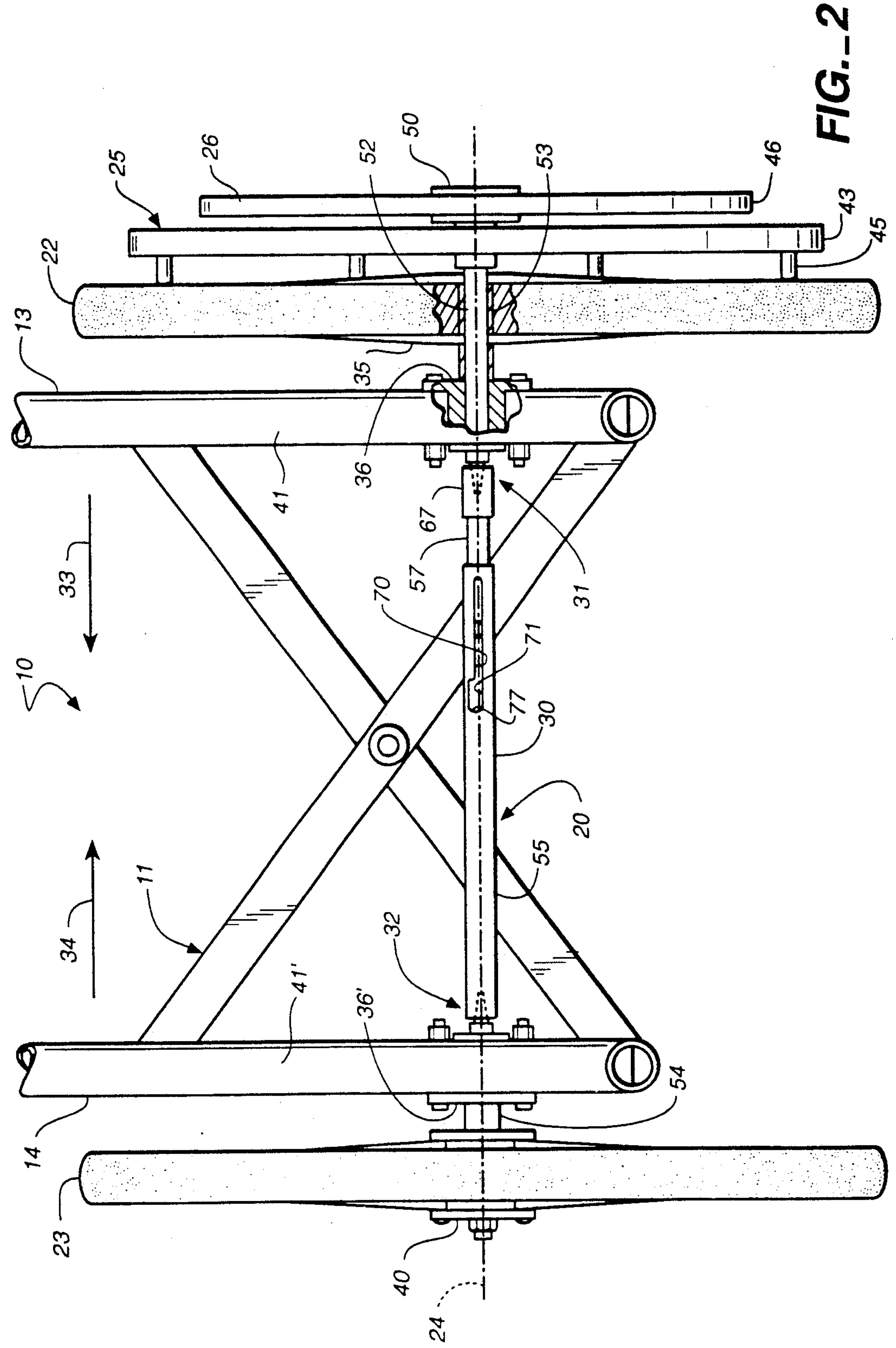
FIG. 2 is an enlarged, fragmentary rear elevation view, partially broken away, of the wheelchair frame assembly incorporating the single-hand manual drive assembly having the working-hand side opposite that of FIG. 1.

Attention is now directed to FIGS. 1 and 2, where the subject single-handed manual drive assembly, generally designated 20, for a manual wheelchair 10 is illustrated. Wheelchair 10 includes a wheelchair frame 11 which carries and supports a seat 12 thereon. Briefly, the present invention includes a first drive wheel, generally designated 22, rotatably mounted to one side 13 of frame 11, while a second drive wheel 23 is rotatably mounted to an opposite side 14 of frame 11. First drive wheel 22 and second drive wheel 23 are substantially aligned to rotate about a substantially horizontal common wheel axis 24. A first manual hand-rim assembly, generally designated 25, is operably mounted adjacent first drive wheel 22 for manual operation thereof. A second manual hand-rim assembly, generally designated 26, is positioned proximate first drive wheel 22 and is mounted for rotation relative to first drive wheel 22 about common wheel axis 24. An elongated detachable drive axle member, generally designated 30, is coupled between second hand-rim assembly 25 and second drive wheel 23 which is substantially axially aligned to rotate about common wheel axis 24. Drive axle 30 includes a first latching mechanism 31 on one end thereof which releasably and operatively couples drive axle 30 to second hand-rim assembly 26. Similarly, an opposite end of drive axle 30 includes a second latching mechanism 32 which releasably and operatively couples drive axle 30 to second drive wheel 23. Accordingly, rotational manual operation of second hand-rim assembly, positioned proximate first drive wheel 22, manually drives second drive wheel 23.

In accordance with the present invention, drive axle 30 is completely detachable from drive assembly 20 at both first latching mechanism 31 and at second latching mechanism 32. Thus, this configuration is particularly suitable for collapsible manual drive wheelchairs of the type illustrated in FIGS. 1 and 2. Once drive axle 30 has been detached and removed, wheelchair frame 11 can be collapsed inwardly in the direction of arrows 33 and 34 (FIG. 2) in a manner similar to most conventional two-handed manual drive wheelchairs with collapsible frames. Hence, triplegic persons are more capable of independently collapsing the wheelchair frame and do not have to consider opposition by the drive axle. Moreover, as will be described in greater detail below, first latching mechanism 31 and second latching mechanism 32 are formed and dimensioned to compensate for wear and tear, which adversely affects interaction between components, thereby maintaining a stable secure engagement. More specifically, backlash between second hand-rim assembly 26 and second drive wheel 23, unlike the prior art pivotally jointed drive axles, is substantially reduced.

Figure 4:
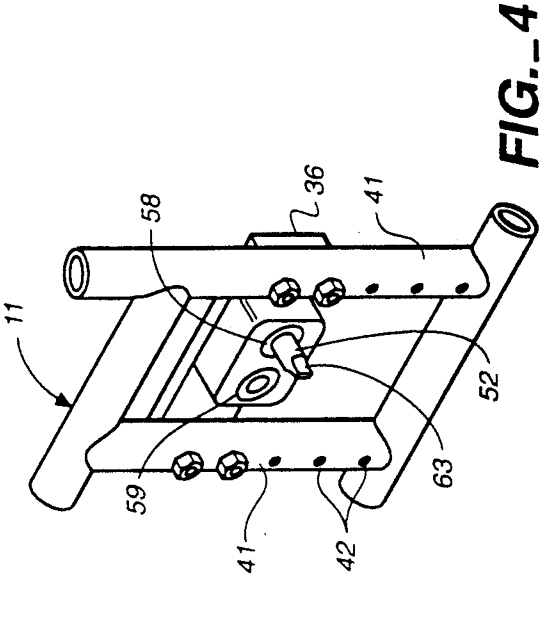
FIG. 4 is an enlarged, fragmentary, top perspective view of an axle bearing plate of the single-hand manual drive assembly of FIG. 3 mounted to the wheelchair frame.

First drive wheel 22 includes a corresponding central wheel hub 35 which is rotatably supported by a first axle plate 36. First plate 36, as viewed in FIGS. 2 and 4, is rigidly mounted to vertical posts 41 positioned on one side 13 (right side in FIG. 2) of frame 11. Similarly, second drive wheel 23 includes a central wheel hub 40 rotatably supported by a second axle plate 36' which is rigidly mounted to vertical posts 41' positioned on opposite side 14 (left side in FIG. 2) of frame 11. FIG. 4 illustrates that the vertical posts provide a plurality of mounting holes 42 so that the height of the first axle plate and the second axle plate can be vertically adjusted relative to the respective vertical posts. Moreover, as will be apparent, conventional two-handed manual drive wheelchair frames can be retrofit with the single-hand drive assembly of the present invention.

First hand-rim assembly 25 includes a first hand-ring 43 rigidly mounted to an outer rim portion 44 (FIG. 1) of first drive wheel 22 by ring brackets 45 (FIG. 2). Manual rotational operation of the first hand-ring (FIGS. 1 and 2) by an occupant, hence, directly drives first drive wheel 22. Second hand-rim assembly 26 includes a second hand-ring 46 positioned adjacent to first hand-ring 43 and just outwardly thereof in a direction away from frame side 13 of wheelchair frame 11. Preferably, the second hand-ring is positioned sufficiently close to and is of a diameter which permits the occupant to grip both hand-rings simultaneously to manually propel the wheelchair forward or rearward in a straight line, or to only grip one hand-ring to turn the wheelchair. It will be appreciated, however, that the relative dimensions and distances between first hand-rim assembly 25 and second hand-rim assembly 26 may vary to accommodate various size users without departing from the true spirit and nature of the present invention.

Second hand-rim assembly 26 further includes a central hand-rim hub portion 50 upon which second hand-ring portion 46 is mounted thereto through a plurality of radially extending spokes 51 (FIG. 1). FIG. 2 illustrates that a hand-rim drive shaft 52 extends away from hand-rim hub 50 in the direction of arrow 33 and toward detachable drive axle 30. Hand-rim drive shaft 52 is positioned coaxially through first wheel hub 35 and through first plate 36. First wheel hub 35 includes a hub bearing 53 which rotatably supports hand-rim shaft 52 and permits relative axial rotational motion therebetween about common rotational axis 24. Second hand-rim assembly 26, therefore, can be manually rotated independent of first hand-rim assembly 25 and of first drive wheel 22. Similarly, first axle plate 36 includes a plate bearing 58 which rotatably supports hand-rim drive shaft 52 as it extends therethrough.

Figure 3:
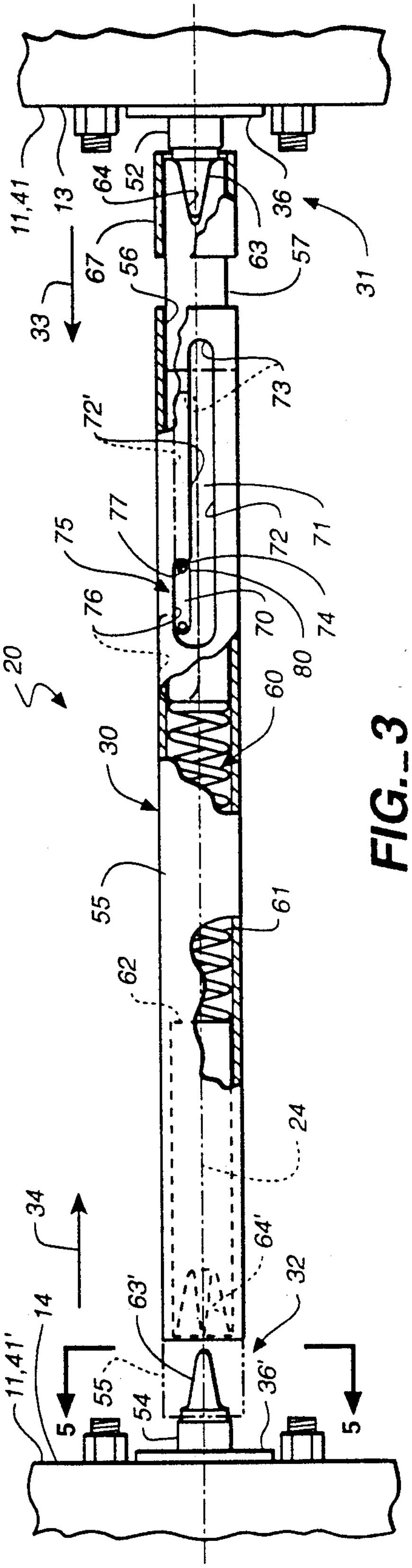
FIG. 3 is an enlarged, fragmentary, front elevation view, partially broken away, of the single-hand manual drive assembly of FIG. 2 illustrating release of the drive axle from the hand-rim drive shaft.

Projecting away from second wheel hub 40 of second drive wheel 23 in a direction of arrow 34 and toward detachable drive axle 30 is a wheel drive shaft 54 (FIGS. 2 and 3). However, unlike the substantial rotational independence between the hand-rim drive shaft and the first wheel hub, the rotation of second wheel hub 40 is proportionately dependent upon the rotation of wheel drive shaft 54 so that manually rotation of the wheel drive shaft will propel the second drive wheel.

Figure 5:
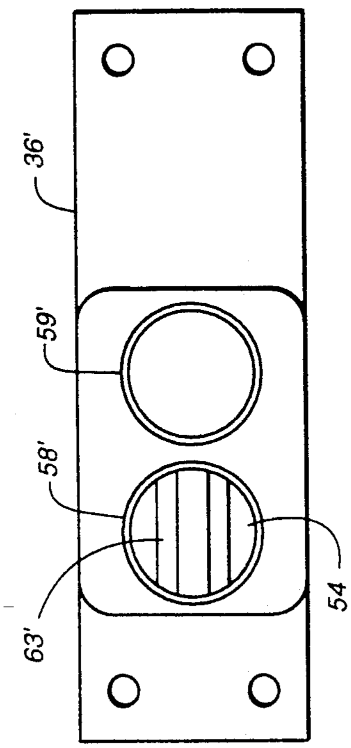
FIG. 5 is a fragmentary, side elevation view of the axle bearing plate taken substantially along the plane 5—5 in FIG. 3.

FIG. 2 shows that wheel drive shaft 54 extends through and is rotatably supported by second plate 36'. Preferably, rotational support of wheel drive shaft 54 is provided by a plate bearing 58' (FIG. 5) contained in the second axle plate. Moreover, as shown in FIGS. 4 and 5, the first and second axle plates preferably provide additional plate bearings 59 and 59', upon which the drive shafts can be rotatably supported. There additional bearings allow common rotational axis 24 to be moved forward or rearward relative wheelchair frame 11. Accordingly, in addition to the vertical height adjustments of the axle plates provided by mounting holes 42, the multiple plate bearings provide flexibility to reposition the center of gravity of the wheelchair. In some instances, the axle plate may be rotated 180° which further repositions the plate bearings, and hence, common rotational axis 24. It will be appreciated, however, that the axle plate bearings chosen for use, and hence hand-rim drive shaft 52 and second wheel drive shaft 54, must be axially aligned in a manner where the first drive wheel and the second drive wheel rotate about common rotational axis 24.

Referring now to FIG. 3 and as already mentioned, drive axle 30 operably, but removably, couples hand-rim drive shaft 52 to second wheel drive shaft 54 such that manual rotation of second hand-rim assembly 26 drives second drive wheel 23. Accordingly, when the first latching mechanism removably mounts one end of detachable drive axle 30 to the distal end portion of hand-rim drive shaft 52 and when the second latching mechanism removably mounts the opposing end of drive axle 30 to the distal end portion of second wheel drive shaft 54, the longitudinal axis of the drive axle is aligned coaxially with common rotational axis 24.

In the preferred form, detachable drive axle 30 is provided by a spring tube member 55 (or first drive axle) having a substantially cylindrical tube bore or receiving cavity 56 on one distal end thereof. Second latching mechanism 32 removably and operably secures the opposite distal end of tube member 55 to wheel drive shaft 54. FIG. 3 illustrates that drive axle 30 is further provided by a sliding drive rod 57 (or second drive axle) having one end formed and dimensioned for sliding axial receipt in cavity 56. Similarly, first latching mechanism 31 removably and operably secures the opposite distal end of drive rod 57 to hand-rim drive shaft 52.

Therefore, the spring tube and the sliding drive rod telescopically cooperate to manually and smoothly reciprocate drive axle 30 in and out of the tube bore along its longitudinal axis (i.e., coaxial with common rotational axis 24 when mounted to drive assembly 20) between a latched condition (as shown in phantom lines in FIG. 3 at the end of spring tube 55 facing wheel drive shaft 54) and an unlatched condition (solid lines in FIG. 3). In the unlatched condition, both latching mechanisms are operably secured to their respective drive shafts, while in the unlatched condition, at least one of the first latching mechanism 31 and the second latching mechanism 32 (as illustrated in FIG. 3) is manually withdrawn out of engagement with the respective drive shaft. Accordingly, once drive axle 30 is positioned in the latched condition, and the latching mechanisms are secure to the respective drive shafts, as will be described in greater detail below, manual operation of the second hand-rim assembly from the working-hand side of the wheelchair (i.e., the right side in FIG. 2) will rotatably drive the second drive wheel. Moreover, when drive axle 30 is manually moved to the unlatched condition, at least one of the latching mechanisms is withdrawn out of engagement so that the drive axle can be removed. Wheelchair frame 11, hence, will then be in a suitable position to be collapsed.

In accordance with the present invention, a biasing means 60 is included which biases drive axle 30 toward the latched position. Biasing means is preferably provided by a compression spring 61 which is positioned in tube bore or receiving cavity 56. One end of spring 61 is seated against a cavity end wall 62 while the opposite spring end abuts sliding rod 57. Hence, the compression spring biases the sliding rod outwardly of the receiving cavity in a direction along the longitudinal axis of drive axle 30. Accordingly, when drive axle 30 is mounted to manual drive assembly 20, compression spring 61 urges drive axle 30 to the latched condition where first and second latching mechanisms 31 and 32, respectively, are releasably and operably engaged with the respective drive shafts. Very importantly, however, compression spring 61 can be compressed inwardly along the axle longitudinal axis which moves drive axle 30 to the unlatched condition.

For the ease of description, only one latching mechanism will be described in detail henceforth. It will be understood that both latching mechanisms are preferably identical and may even be interchanged. As best viewed in FIGS. 3–5, first latching mechanism 31 includes a first latch surface 63, provided by hand-rim drive shaft 52, which cooperatively interengages a second latch surface 64, provided by wheel drive shaft 54. This interengagement provides a stable, yet releasable, mount therebetween when the drive axle is in the latched condition and the corresponding surfaces are correctly aligned and engaged.

In the preferred embodiment and as best illustrated in FIG. 3, first latch surface 63 of hand-rim drive shaft 52 is provided by an inwardly tapered tongue portion 63 projecting from one distal end of hand-rim shaft 52. Second latch surface 64 is provided by a wedge-shaped receiving slot 64, which preferably is formed and dimensioned to substantially mate with and releasably receive tongue portion 63, when the tongue is oriented in an angularly aligned orientation relative slot 64. Preferably, drive axle 30 includes a sleeve member 67 positioned around slot 64 which facilitates axial alignment of the drive axle and reduces lateral movement of the tongue portion relative the receiving slot when operably interengaged. Once tongue portion 63 is angularly aligned with slot 64, sliding drive rod 57 can be moved into engagement with hand-rim drive shaft 52 (i.e., in the latched condition) which releasably locks the components of first latching mechanism 31 together.

Biasing means 60 biases sliding drive rod 57 outwardly of receiving cavity 56 so that the tongue portion is snugly urged into wedge-shaped slot 64. This mating configuration (i.e., tapered tongue portion 63 and wedge-shaped slot 64), when interengaged, provides considerable stability between the sliding drive rod and the hand-rim drive shaft by reason of the interengaged tapering latch surfaces 63 and 64, and the similarly formed surfaces on the opposite side of the tongue and the slot. Such interengagement greatly reduces any slack or looseness in the latched condition so that drive axle 30 will not rotate or oscillate about common axis 24 relative hand-rim drive shaft 52. Hence, once the drive axle is in the extended latched condition and the respective components of the first and second latching mechanisms are angularly aligned and interengaged, manual rotation of second hand-rim assembly 26, to rotatably drive second drive wheel 23, may commence without substantial backlash between the components. This holds true even when the engaging surfaces of the interengaged latch surfaces begin to wear. Because of this wedge-shaped interengagement, as the surfaces wear, tongue portion 63 just seats further into slot 64 through the force of compression spring 61.

In accordance with the present invention, drive axle 30 can be detached and removed from manual drive assembly 20 by manually moving drive axle 30 to the unlatched condition. As best viewed in FIG. 3, compression spring 61 is manually compressed during movement of spring tube member 55 toward the unlatched condition which moves sliding drive rod 57 further into receiving cavity 56. The corresponding tongue receiving slot 64' of second latching mechanism 32, provided on the distal end of tube member 55, is released from the latched condition and moved to a stable unlatched condition by overcoming the resistance force of biasing means 60 and withdrawing slot 64' axially in the direction of arrow 34. Once receiving slot 64' is out of mating engagement with corresponding tongue portion 63' (as shown in solid lines in FIG. 3), first latching mechanism 31 can then be disengaged by withdrawing the drive axle away from sliding drive rod 57.

It will be appreciated, however, that first latching mechanism 31 could have been detached and withdrawn out of engagement before the second latching mechanism was disengaged. Further, it is conceivable that the tongue portions of the latching mechanisms could have been provided on the drive axle while the receiving slots could have been provided on the drive shafts without departing from the true spirit and nature of the present invention.

In the preferred form and as shown in FIG. 3, an elongated sliding guide key 70 extends radially outwardly from sliding rod 57 which cooperates with spring tube member 55 to reciprocally guide drive rod 57 in and out of receiving cavity 56. Key 70 further provides a means for substantially preventing relative rotational motion, about the drive axle longitudinal axis, between drive rod 57 and tube member 55 when drive axle is in the latched condition.

Guide key 70 preferably projects outwardly through an elongated guide opening 71 which extends longitudinally along tube member 55. Guide opening 71 further extends through the outer surface of tube member 55 into tube bore or receiving cavity 56 and includes opposing guide side surfaces 72 and 72' which reciprocally guide key 70, and hence the drive rod between the latched condition and the unlatched condition. Guide surfaces 72, 72' are positioned sufficiently close to the opposing sides of key 70 to substantially prevent relative rotational motion between the drive rod and the tube member. Accordingly, backlash of manual drive assembly 20 is minimized during manual operation.

Furthermore, under the force of compression spring 61, guide key 70 is urged toward the latched condition and along guide side surfaces 72, 72' of guide opening 71. Travel of key 70 through guide opening 71 is limited by stopping means 73 which is positioned proximate the distal end of tube member 55. Hence, stopping means also limits the telescopic extension of sliding drive rod 57 from cavity 56. It is noted, however, that extension of drive rod 57 from cavity 56 is sufficiently adequate to permit single-handed manual drive assembly 20 to be retrofit to a variety of wheelchair frames.

Preferably, as viewed in FIG. 3, stopping means 73 is provided by an edge surface at one end of guide opening 71 which is formed to engage an end portion of 74 guide key 70. As compression spring 61 urges the end portion of key 70 against edge surface 73, drive rod 57 is limited in extension and, further, prevented from being ejected from the tube bore.

In addition to providing a drive axle which can be removably detached from the manual drive assembly, it is a further important feature of the present invention to provide a single-handed manual drive assembly having a detachable drive axle which can be releasably locked in the unlatched condition. Thus, a locking means 75 is preferably provided which releasably locks sliding drive rod 57 relative to spring tube member 55 while retracted in receiving cavity 56. This feature substantially facilitates installation and removal of the drive axle to and from the manual drive assembly which can be difficult to maneuver by triplegic persons with use of only one hand.

As best viewed in FIG. 3, locking means 75 includes a locking recess 76 integrally formed at an opposite end of guide opening 71 which is formed and dimensioned to releasably retain and engage semi-circular shaped end 74 of key 70 therein. Locking recess 76 includes a mating semi-circular shaped edge portion 77 having a retaining lip 80 which collectively substantially retains key 70 in recess 76 as compression spring 61 urges end 74 against edge portion 77.

Accordingly, to engage locking means 75, compression spring 61 is manually compressed by moving spring tube member 55 toward the unlatched condition from the latched condition. As sliding drive rod 57 moves further into receiving cavity 56, guide key 70 moves along guide opening 71 toward recess 76. Simultaneously, receiving slot 64' of second latching mechanism 32 is withdrawn from engagement with tongue portion 63'. Once key 70 is moved into recess and the second (or the first) latching mechanism 32 is completely disengaged, spring tube member 55 is manually rotated, relative to sliding drive rod 57, until key 70 is positioned in recess 76. In the preferred form, the tube member is rotated approximately 30° about the drive axle longitudinal axis (coaxial with common rotational axis when mounted to manual drive assembly 20) which moves key 70 from alignment with guide opening 71 and into locking recess 76. FIG. 3 illustrates that tube member 55 is then manually released such that compression spring 61 urges semi-circularly shaped end 74 of key 70 into engaging contact with locking edge portion 77. Hence, locking means 75 releasably locks drive axle 30 in the unlatched position (as shown in solid lines in FIG. 3), where first latching mechanism 31 can then be unlatched by the wheelchair occupant with one hand by withdrawing the drive axle away from sliding drive rod 57.

To release drive axle 30 from the unlatched condition, the drive axle is manually compressed until end portion 74 of guide key 70 is positioned out of engagement of edge portion 77 and retaining lip 80. Spring tube member 55 is then rotated about the drive axle longitudinal axis, relative to drive rod 57, which moves guide key 70 back into alignment with guide opening 71 (phantom lines in FIG. 3).

In the preferred embodiment, a second guide key, a corresponding guide opening and a locking means (all not shown) may be provided on an opposite side of drive axle 30. This configuration provides a more balanced retainment and alignment of the sliding drive rod with the spring tube member.

Figure 6:
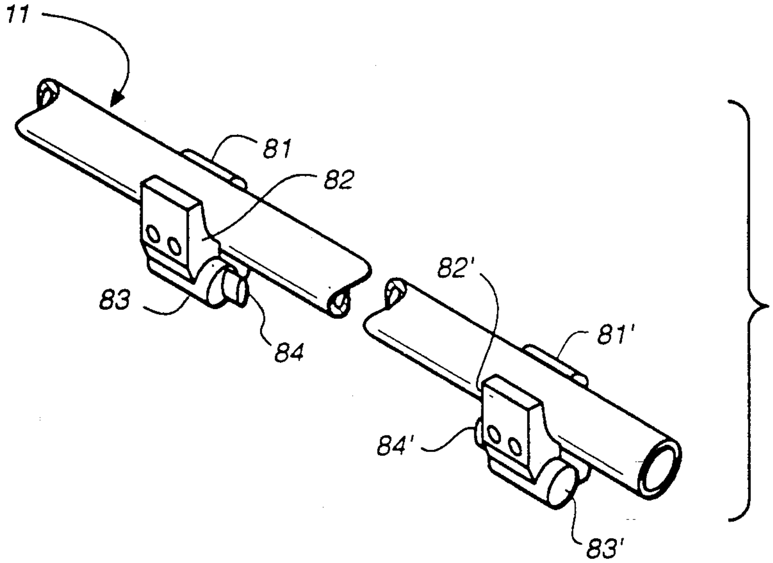
FIG. 6 is a fragmentary top perspective view of drive axle storage brackets of the present invention mounted to a portion of the wheelchair frame.

In another aspect of the present invention, storing brackets 81 and 81' are included which permit drive axle 30 to be mounted to wheelchair frame 11 when the frame is collapsed. FIG. 6 illustrates that the storage brackets include frame clamps 82 and 82' formed to grip storage post members 83 and 83', respectively. Each post member provides storage tongue portions 84 and 84' formed and dimensioned substantially similar to wheel tongue portion 63' and hand-rim tongue portion 63.

Brackets 81 and 81' are suitably spaced-apart along a portion of frame means 11 so that compression spring 61 urges receiving slots 64 and 64' against respective storage tongue portions 84 and 84', respectively, during stored mounting. It will be understood that the procedure to mount and demount axle member 30 to and from storage brackets 81 and 81' is substantially similar to the above-mentioned procedure to mount and demount axle member 30 to manual drive assembly 20.

What is claimed is:

1. A single-hand manual drive wheelchair assembly comprising:

frame means for supporting a seat;

a first drive wheel rotatably mounted to one side of said frame means;

a second drive wheel rotatably mounted to an opposite side of said frame means, said first drive wheel and said second drive wheel being substantially aligned to rotate about a common wheel axis.

a manual hand-rim assembly positioned proximate said first drive wheel and mounted for rotation relative to said first drive wheel about said common wheel axis; and an elongated axle means coupled between said hand-rim assembly and said second drive wheel and substantially axially aligned to rotate about said common wheel axis, said axle means including first latching means on one end thereof releasably coupled to said hand-rim assembly and second latching means on an opposite end thereof releasably coupled to said second drive wheel for manual operation of said second drive wheel from said hand-rim assembly on said one side, said axle means being manually movable between a selected one of a latched condition, for providing interengagement of said first latching means with said hand-rim assembly and of said second latching means with said second drive wheel, and an unlatched condition, for disengaging at least one of said first latching means from said hand-rim assembly and said second latching means from said second drive wheel, said axle means further including a first drive axle, and an opposing second drive axle aligned substantially axially with said first drive axle, said second drive axle providing a longitudinal receiving cavity defined by an inner side wall at one distal end of said second drive axle, said cavity being formed and dimensioned for telescopic sliding receipt of one distal end of said first drive axle to provide sliding axial displacement between said latched condition and said unlatched condition;

biasing means interposed between said first drive axle and said second drive axle for biasing said axle means toward said latched position; and guide means for guiding relative axial sliding displacement of said first drive axle and said second drive axle between said latched condition and said unlatched condition, said guide means including a guide key member affixed to and extending radially outward from said first drive axle, and a longitudinal guide opening provided in the inner side wall of said cavity, and formed and dimensioned for sliding engagement with said key member to guide said first drive axle relative said second drive axle between said latched condition and said unlatched condition.

2. The single-hand manual drive wheelchair assembly as defined in claim 1 wherein, said biasing means is provided by a compression spring disposed in said cavity and abutting the one distal end of said first drive axle.

3. The single-hand manual drive wheelchair assembly as defined in claim 1 further including:

locking means interposed between said first drive axle and said second drive axle for locking said axle means in said unlatched condition.

4. The single-hand manual drive wheelchair assembly as defined in claim 3 wherein, said locking means includes a locking recess provided in said inner side wall and formed for releasable retainment of said guide key therein, said locking recess being integral with said guide opening such that manual rotation of said first drive axle relative said second drive axle about a longitudinal axis of said axle member moves said guide key between said guide opening and said locking recess when said axle means is moved proximate said unlatched condition.

5. The single-hand manual drive wheelchair assembly as defined in claim 4 wherein, said locking recess includes a retaining lip portion formed to releasably retain said guide key therein, and said biasing means urges said guide key toward engagement with said retaining lip when said guide key is manually rotated into said locking recess.

6. The single-hand manual drive wheelchair assembly as defined in claim 1 wherein, said hand-rim assembly includes a hand-rim drive shaft extending axially outward along said common wheel axis toward said first drive axle, said second drive wheel includes a second wheel drive shaft extending axially outward therefrom along said common wheel axis toward said second drive axle, said first latching means includes a first hand-rim surface provided on a distal end of said hand-rim drive shaft and a second hand-rim surface provided on an opposing distal end of said first drive axle, said first hand-rim surface and said second hand-rim surface being in aligned cooperative engagement when said axle member is moved to said latched condition, and said second latching means includes a first wheel surface provided on a distal end of said wheel drive shaft and a second wheel surface provided on an opposing distal end of said second drive axle, said first wheel surface and said second wheel surface being in aligned cooperative engagement when said axle member is moved to said latched condition.

7. The single-hand manual drive wheelchair assembly as defined in claim 6 wherein, said first ha surface includes a hand-rim tongue portion projecting outward from the distal end of hand-rim drive shaft and said second hand-rim surface is formed with a hand-rim slot dimensioned for receipt of said hand-rim tongue portion when said first hand-rim surface and said second hand-rim surface cooperatively engage to releasably latch said first drive axle to said hand-rim drive shaft, and said second hand-rim surface includes a wheel tongue portion projecting outward from the distal end of said wheel drive shaft and said second wheel surface is formed with a wheel slot dimensioned for receipt of said wheel tongue portion when said first wheel surface and said second wheel surface cooperatively engage to releasably latch said second drive axle to said wheel drive shaft.

8. The single-hand manual drive wheelchair assembly as defined in claim 7 wherein, said hand-rim tongue portion and said wheel tongue portion each taper inwardly.

9. The single-hand manual drive wheelchair assembly as defined in claim 6 further including:

a first axle p releasably mounting said first drive wheel and said hand-rim assembly as a unit to the one side of said frame means and including a first hand-rim bearing formed for receipt therethrough and providing rotatable support of said hand-rim drive shaft about said common wheel axis; and a second axle plate releasably mounting said second drive wheel to the opposite side of said frame means and including a first wheel bearing formed for receipt therethrough and providing rotatable support of said wheel drive shaft about said common wheel axis.

10. The single-hand manual drive wheelchair assembly as defined in claim 9 wherein, said first axle plate includes a second hand-rim bearing mounted adjacent said first hand-rim bearing and formed for receipt therethrough and providing rotatable support of said hand-rim drive shaft, and said second axle plate including a second wheel bearing mounted adjacent said first wheel bearing and formed for receipt therethrough and providing rotatable support of said wheel drive shaft, said second hand-rim bearing and said second wheel bearing cooperating to move said common wheel axis relative said frame means.

11. The single-hand manual drive wheelchair assembly defined in claim 1 wherein, said frame means is collapsible in directions inwardly in a manner such that said one side and said opposite side of said frame means are moved closer together.

12. The single-hand manual drive wheelchair assembly as defined in claim 11 further including:

bracket means mounted to said frame means and formed for releasably mounting said axle means to said frame means for storage thereof when said frame means is collapsed.

13. A single-hand manual drive wheelchair assembly comprising:

frame means for supporting a seat;

a first drive wheel rotatably mounted to one side of said frame means;

a second drive wheel rotatably mounted to an opposite side of said frame means, said first drive wheel and said second drive wheel being substantially aligned to rotate about a common wheel axis;

a manual hand-rim assembly positioned proximate said first drive wheel and mounted for rotation relative to said first drive wheel about said common wheel axis;

an elongated axle means coupled between said hand-rim assembly and said second drive wheel and substantially axially aligned to rotate about said common wheel axis, said axle means including first latching means on one end thereof releasably coupled to said hand-rim assembly and second latching means on an opposite end thereof releasably coupled to said second drive wheel for manual operation of said second drive wheel from said hand-rim assembly on said one side, said axle means being manually movable between a selected one of a latched condition, for providing interengagement of said first latching means with said hand-rim assembly and of said second latching means with said second drive wheel, and an unlatched condition, for disengaging at least one of said first latching means from said hand-rim assembly and said second latching means from said second drive wheel, said axle means further including a first drive axle, and an opposing second drive axle aligned substantially axially with said first drive axle and cooperating to provide sliding axial displacement between said latched condition and said unlatched condition;

a hand-rim drive shaft extending axially outward from said hand-rim assembly along said common wheel axis toward said first drive axle, said first latching means further including a first hand-rim surface provided on a distal end of said hand-rim drive shaft and a second hand-rim surface provided on an opposing distal end of said first drive axle, said first hand-rim surface and said second hand-rim surface being in aligned cooperative engagement when said axle member is moved to said latched condition; and a second wheel drive shaft extending axially outward from said second drive wheel along said common wheel axis toward said second drive axle, said second latching means further including a first wheel surface provided on a distal end of said wheel drive shaft and a second wheel surface provided on an opposing distal end of said second drive axle, said first wheel surface and said second wheel surface being in aligned cooperative engagement when said axle member is moved to said latched condition.

14. The single-hand manual drive wheelchair assembly as defined in claim 13 wherein, said first hand-rim surface includes a hand-rim tongue portion projecting outward from the distal end of hand-rim drive shaft and said second hand-rim surface is formed with a hand-rim slot dimensioned for receipt of said hand-rim tongue portion when said first hand-rim surface and said second hand-rim surface cooperatively engage to releasably latch said first drive axle to said hand-rim drive shaft, and said second hand-rim surface includes a wheel tongue portion projecting outward from the distal end of said wheel drive shaft and said second wheel surface is formed with a wheel slot dimensioned for receipt of said wheel tongue portion when said first wheel surface and said second wheel surface cooperatively engage to releasably latch said second drive axle to said wheel drive shaft.

15. The single-hand manual drive wheelchair assembly as defined in claim 14 wherein, said hand-rim tongue portion and said wheel tongue portion each taper inwardly.

16. The single-hand manual drive wheelchair assembly as defined in claim 13 further including:

a first axle plate releasably mounting said first drive wheel and said hand-rim assembly as a unit to the one side of said frame means and including a first hand-rim bearing formed for receipt therethrough and providing rotatable support of said hand-rim drive shaft about said common wheel axis; and a second axle plate releasably mounting said second drive wheel to the opposite side of said frame means and, including a first wheel bearing formed for receipt therethrough and providing rotatable support of said wheel drive shaft about said common wheel axis.

17. The single-hand manual drive wheelchair assembly as defined in claim 16 wherein, said first axle plate includes a second hand-rim bearing mounted adjacent said first hand-rim bearing and formed for receipt therethrough and providing rotatable support of said hand-rim drive shaft, and said second axle plate including a second wheel bearing mounted adjacent said first wheel bearing and formed for receipt therethrough and providing rotatable support of said wheel drive shaft, said second hand-rim bearing and said second wheel bearing cooperating to move said common wheel axis relative said frame means.

* * * * *

UNITED STATES PATENT AND TRADEMARK OFFICE
CERTIFICATE OF CORRECTION

PATENT NO. : 5,306,035

DATED : April 26, 1994

INVENTOR(S) : David M. Counts

It is certified that error appears in the above-identified patent and that said Letters Patent is hereby corrected as shown below:

Column 11, line 51, claim 7, after "first" delete "ha" and insert therefor --hand-rim--.

Column 12, line 7, claim 9, after "axle" delete "p" and insert therefor --plate--.

Signed and Sealed this

Second Day of August, 1994

Attest:

BRUCE LEHMAN

*Attesting Officer* *Commissioner of Patents and Trademarks*